United States Patent
Sivakumar

(10) Patent No.: US 11,708,071 B2
(45) Date of Patent: Jul. 25, 2023

(54) TARGET-ORIENTATED NAVIGATION SYSTEM FOR A VEHICLE USING A GENERIC NAVIGATION SYSTEM AND RELATED METHOD

(71) Applicants: Denso International America, Inc., Southfield, MI (US); DENSO CORPORATION, Kariya (JP)

(72) Inventor: Prasanna Kumar Sivakumar, Canton, MI (US)

(73) Assignees: DENSO CORPORATION, Kariya (JP); Denso International America, Inc., Southfield, MI (US)

( * ) Notice: Subject to any disclaimer, the term of this patent is extended or adjusted under 35 U.S.C. 154(b) by 424 days.

(21) Appl. No.: 16/834,142

(22) Filed: Mar. 30, 2020

(65) Prior Publication Data

US 2021/0300357 A1    Sep. 30, 2021

(51) Int. Cl.
*B60W 30/095* (2012.01)
*G05D 1/02* (2020.01)

(52) U.S. Cl.
CPC ....... *B60W 30/0956* (2013.01); *G05D 1/0214* (2013.01); *B60W 2554/80* (2020.02);
(Continued)

(58) Field of Classification Search
CPC ......... B60W 30/0956; B60W 2556/50; B60W 2554/80; G05D 1/0214; G05D 2201/0212; G05D 2201/0213
See application file for complete search history.

(56) References Cited

U.S. PATENT DOCUMENTS

| 5,508,689 A | 4/1996 | Rado et al. |
| 6,792,345 B2 | 9/2004 | Matsumoto et al. |

(Continued)

FOREIGN PATENT DOCUMENTS

| CN | 103935361 A | 7/2014 |
| CN | 104133473 A | 11/2014 |

(Continued)

OTHER PUBLICATIONS

Lange et al., "Multi Agent System Optimization in Virtual Vehicle Testbeds," EAI Endorsed Transactions on Smart Cities, 10 pages (2015).

(Continued)

*Primary Examiner* — Tarek Elarabi
(74) *Attorney, Agent, or Firm* — Christopher G. Darrow; Darrow Mustafa PC

(57) ABSTRACT

A target-orientated navigation system and related method for a vehicle having a generic navigation system includes one or more processors and a memory. The memory includes one or more modules that cause the processor to receive perception data, discretize the perception data into a plurality of lattices, generate a collision probability array having a plurality of cells that correspond to the plurality of lattices, determine which cells of the collision probability array satisfy a safety criteria, receive an artificial potential field array having a plurality of cells that correspond to the plurality of cells of the collision probability array, generate, an objective score array having a plurality of cells corresponding to the cells of the collision probability array, and direct a vehicle control system of the vehicle to guide the vehicle to a location representative of a cell in the objective score array that has a highest value.

18 Claims, 8 Drawing Sheets

(52) U.S. Cl.
CPC . *B60W 2556/50* (2020.02); *G05D 2201/0212* (2013.01); *G05D 2201/0213* (2013.01)

(56) References Cited

U.S. PATENT DOCUMENTS

| | | | |
|---|---|---|---|
| 7,519,457 | B2 | 4/2009 | Hasegawa et al. |
| 8,098,245 | B2 | 1/2012 | Chen et al. |
| 9,915,950 | B2 | 3/2018 | Hartung et al. |
| 10,254,759 | B1 | 4/2019 | Faust et al. |
| 11,048,927 | B2 * | 6/2021 | Russell ................ G06V 20/58 |
| 2010/0100325 | A1 | 4/2010 | Lovell et al. |
| 2013/0211656 | A1 | 8/2013 | An et al. |
| 2015/0046078 | A1 * | 2/2015 | Biess ................ G08G 1/163 |
| | | | 701/301 |
| 2015/0057835 | A1 | 2/2015 | Streubel |
| 2017/0060133 | A1 | 3/2017 | Seo et al. |
| 2017/0308094 | A1 | 10/2017 | Abe et al. |
| 2018/0032082 | A1 | 2/2018 | Shalev-Shwartz et al. |
| 2019/0004524 | A1 | 1/2019 | Wang et al. |
| 2019/0049967 | A1 | 2/2019 | Lim et al. |
| 2019/0122037 | A1 | 4/2019 | Russell et al. |
| 2019/0291728 | A1 | 9/2019 | Shalev-Shwartz et al. |

FOREIGN PATENT DOCUMENTS

| | | |
|---|---|---|
| JP | 2010089716 A | 4/2010 |
| JP | 2011253302 A | 12/2011 |
| JP | 2015141053 A | 8/2015 |
| KR | 101214474 B1 | 12/2012 |
| WO | 2017068701 A1 | 8/2018 |
| WO | 2018172849 A1 | 9/2018 |
| WO | 2019222358 A1 | 11/2019 |

OTHER PUBLICATIONS

Ortiz et al., "A Control Software Architecture for autonomous vehicles inspired in generic components," 2011 19th Mediterranean Conference on Control and Automation (MED), p. 1217-1222.

Bojarski et al., "End to End Learning for Self-Driving Cars," arXiv:1604.07316v1 [cs.CV] Apr. 25, 2016.

Jaritz et al., "End-to-End Race Driving with Deep Reinforcement Learning," arXiv:1807.02371v2 [cs.CV] Aug. 31, 2018.

Xu et al., "End-to-end Learning of Driving Models from Large-scale Video Datasets," arXiv:1612.01079v2 [cs.CV] Jul. 23, 2017.

Zhu et al., "Robot Path Planning Based on Artificial Potential Field Approach with Simulated Annealing," Sixth International Conference on Intelligent Systems Design and Applications, 6 pages (2006).

Kim et al., "New Potential Functions for Multi Robot path planning: SWARM or SPREAD," The 2nd International Conference on Computer and Automation Engineering, vol. 2, 5 pages (2010).

Ge et al., "New Potential Functions for Mobile Robot Path Planning," IEEE Transactions on Robotics and Automation, vol. 16, Issue 5 (2000).

* cited by examiner

TARGET-ORIENTATED NAVIGATION SYSTEM FOR A VEHICLE USING A GENERIC NAVIGATION SYSTEM AND RELATED METHOD

TECHNICAL FIELD

The subject matter described herein relates, in general, to systems and methods for piloting a vehicle using a target-orientated navigation system that utilizes generic components, such as generic perception systems, of the vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with fully autonomous systems that can pilot a vehicle with little to no occupant input. These systems may be very complex, expensive, and require the use of numerous dedicated sensors, computational hardware, and the like.

Alternatively, some vehicles have one or more active safety systems that may provide warnings and/or control the vehicle under certain circumstances. These active safety systems may include systems such as lane keep assist, adaptive cruise control, object detection, emergency braking, etc. These active safety systems may not provide a fully autonomous type operation. However, while these systems may not provide fully autonomous operations, these systems do perform some actions that a fully autonomous system may require. For example, these systems collect information from one or more perception sensors and relay this information to a generic navigation decision-making system.

SUMMARY

This section generally summarizes the disclosure and is not a comprehensive explanation of its full scope or all its features.

In one embodiment, a target-orientated navigation system for a vehicle having a generic navigation system includes one or more processors and a memory in communication with the one or more processors. The memory includes a reception module, a discretization module, a collision probability module, an objective score array module, and a vehicle control module. The reception module has instructions that, when executed by the one or more processors, cause the one or more processors to receive perception data from a vehicle perception system. The discretization module includes instructions that, when executed by the one or more processors, cause the one or more processors to discretize the perception data into an area adjacent to a current position of the vehicle comprising a plurality of lattices.

The collision probability module includes instructions that, when executed by the one or more processors, cause the one or more processors to generate a collision probability array having a plurality of cells that correspond to the plurality of lattices. The cells of the collision probability array indicate a likelihood of a collision if the vehicle moves to the area represented by the cells of the collision probability array. The collision probability module may also cause the one or more processors to determine which cells of the collision probability array satisfy a safety criteria.

The objective score array module includes instructions that, when executed by the one or more processors, cause the one or more processors to generate an objective score array having a plurality of cells corresponding to the cells of the collision probability array that satisfied the safety criteria. The values for the cells of the objective score array are based on the values of corresponding cells of the collision probability array and an artificial potential field array. The vehicle control module includes instructions that, when executed by the one or more processors, cause the one or more processors to direct a vehicle control system of the vehicle to guide the vehicle to a location.

In another embodiment, a method for operating a vehicle having a generic navigation control system and a target-orientated navigation system includes the steps of receiving perception data from a vehicle perception system of the vehicle, discretizing the perception data into an area adjacent to a current position of the vehicle comprising a plurality of lattices, generating a collision probability array having a plurality of cells that correspond to the plurality of lattices, determining which cells of the collision probability array satisfy a safety criteria, generating an objective score array having a plurality of cells corresponding to the cells of the collision probability array that satisfied the safety criteria, and directing a vehicle control system of the vehicle to guide the vehicle to a location representative of a cell in the objective score array that has the most desirable value.

The cells of the collision probability array indicate a likelihood of a collision if the vehicle moves to the area represented by the cells of the collision probability array. The values for the plurality of cells of the artificial potential field array are a function of the proximity of the current position of the vehicle from a target position. The values for the cells of the objective score array are based on the values of corresponding cells of the collision probability array and the artificial potential field array.

In yet another embodiment, a non-transitory computer-readable medium for operating a vehicle having a generic navigation control system and a target-orientated navigation system includes instructions that when executed by one or more processors cause the one or more processors to receive perception data from a vehicle perception system of the vehicle, discretize the perception data into an area adjacent to a current position of the vehicle, generate a collision probability array having a plurality of cells that correspond to the plurality of lattices, determine which cells of the collision probability array satisfy a safety criteria, generate an objective score array having a plurality of cells corresponding to the cells of the collision probability array that satisfied the safety criteria, and direct a vehicle control system of the vehicle to guide the vehicle to a location representative of a cell in the objective score array that has the highest value.

Like before, the cells of the collision probability array indicate a likelihood of a collision if the vehicle moves to the area represented by the cells of the collision probability array. The values for the plurality of cells of the artificial potential field array are a function of the proximity of the current position of the vehicle from a target position. The values for the cells of the objective score array are based on the values of corresponding cells of the collision probability array and the artificial potential field array.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Disclosed are systems, methods, and non-transitory mediums that utilize a generic navigation system of a vehicle by a target-orientated navigation system to pilot the vehicle from one location to another. Moreover, the target-orientated navigation system uses information from the generic navigation system to determine a collision probability array. Each of the cells of the collision probability array indicates the likelihood of a collision if the vehicle is piloted towards a location that corresponds with the cell of the collision probability array. The system can determine which cells of the collision probability array satisfies a safety criteria. The safety criteria may be satisfied when the likelihood that the vehicle collides with another object is extremely low, such as less than 5%.

The target-orientated navigation system considers the cells of the collision probability array that satisfy a safety criteria along with an artificial potential field array. The artificial potential field array is an array of cells that represent the closeness of the vehicle to a destination. The system generates an objective score array that includes a plurality of cells that have values that represent where the vehicle should be piloted towards that satisfy both the collision probability array (the safety of the vehicle) and the artificial potential field (the destination where the vehicle wishes to travel). One or more vehicle control systems can then be actuated to pilot the vehicle towards the cell of the objective score array that has the most desirable score. As such, the target-orientated navigation system provides a cost-effective solution for providing autonomous navigation of the vehicle using generic hardware components.

Figure 1:
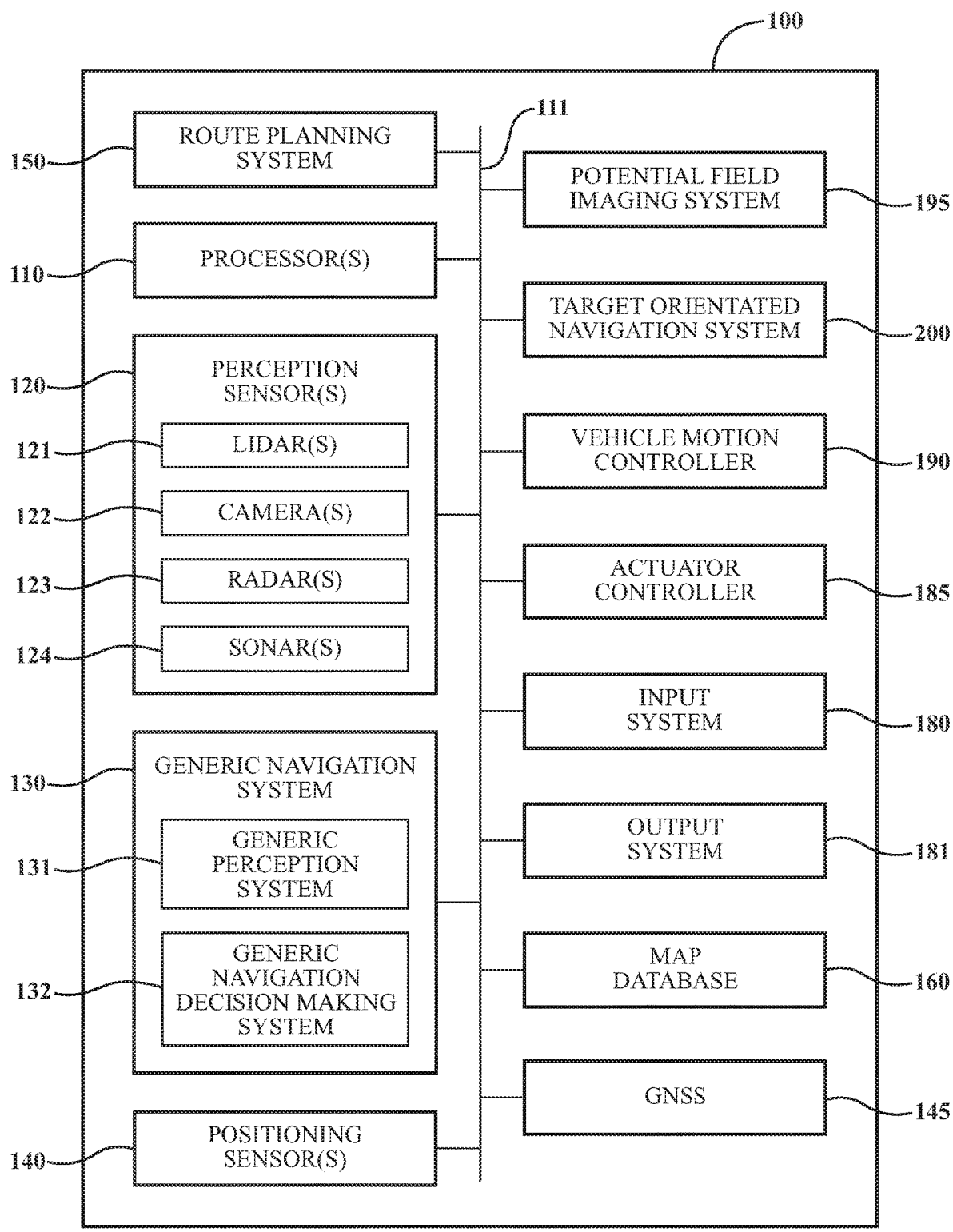
FIG. 1 illustrates a block diagram of a vehicle incorporating a target-orientated navigation system.

Referring to FIG. 1, the vehicle 100 incorporating the target-orientated navigation system 200 is shown. The vehicle 100 may be any form of powered transport that allows for the transportation of occupants and/or items from one location to another. As such, the vehicle 100 could be an automobile, but could also be a light-duty truck, heavy-duty truck, agricultural vehicle, such as a tractor, sport utility vehicle, tractor-trailer, military vehicle, mining vehicle, and the like. Further, the vehicle 100 is not limited to land-based vehicles, but could also include other types of vehicles, such as seagoing vessels and aircraft.

The vehicle 100 may include more or fewer components shown in FIG. 1. In this example, the vehicle 100 includes processor(s) 110 that may communicate with other vehicle systems and subsystems via one or more buses 111. Some or all of the processor(s) 110 may be located within the vehicle 100 or may be located external to the vehicle 100 and assist with performing one or more computations, as will be described later in this specification.

The vehicle 100 may include one or more perception sensor(s) 120. The perception sensor(s) 120 can detect the environment in which the vehicle 100 is operating in and/or any objects within that environment. For example, the perception sensor(s) 120 may include one or more different types of sensors for detecting the environment and any objects within the environment that are external to the vehicle 100.

In one example, the vehicle 100 may include sensors such as LIDAR (light detection and ranging) sensors(s) 121, cameras(s) 122, radar sensor(s) 123, sonar sensor(s) 124. The camera(s) 122 may be high dynamic range imaging camera(s). Furthermore, the camera(s) 122 may include one or more single cameras or one or more stereoscopic cameras. The sensors making up the perception sensor(s) 120 are generally mounted on the vehicle 100 such that they can perceive the environment external to the vehicle 100.

The vehicle 100 may also include a generic navigation system 130. The generic navigation system 130 may include a generic perception system 131 and a generic navigation decision-making system 132. The generic perception system 131 receives information from the perception sensor(s) 120, such as RGB images, radar data, sonar data, three-dimensional point clouds, and the like.

After receiving the information from the perception sensor(s) 120, the generic perception system 131 may then output perception information to the generic navigation decision-making system 132. The perception information may include information regarding the presence, location, and other information of one or more objects located within the environment near the vehicle 100. The generic navigation decision-making system 132 receives the perception information from the generic perception system 131 and makes one or more decisions based on this information.

The generic navigation decision-making system 132 can be one of several different systems that utilize information from the generic perception system 131 and take some type of action. As such, the generic navigation decision-making system 132 could be a lane keep assist system. Lane keep assist systems may be a system that is able to detect the position of the vehicle 100 in relation to one or more road markings that define a lane. Based on the location of the vehicle 100 in relation to the lane, the lane keep assist system can either provide a warning to the occupant of the vehicle 100 that the vehicle 100 has, or is in the process of, veering out of the lane and/or to take control of the vehicle 100 so as to keep the vehicle within the lane. Lane keep assist systems generally do not pilot the vehicle 100 to a destination, but rather keep the vehicle 100 within a lane and require that the occupant of the vehicle 100 to control the vehicle 100 at the appropriate time in order to pilot the vehicle 100 to and intended destination.

The generic navigation system 130 could also be other types of systems as well. For example, the generic navigation system 130 could also include an object detection and emergency braking system that essentially detects the presence of objects using the generic perception system 131 and determines the location of the vehicle 100 in relation to the detected objects, and performs emergency braking or steering to avoid an impending collision with the detected objects.

The generic navigation system 130 could also be an adaptive cruise control system, wherein the vehicle 100, when cruise control is activated, is able to detect objects external to the vehicle and adjust the speed of the vehicle to not collide with any detected objects. As detected objects move away from the vehicle 100, the vehicle 100 may then regain the speed set by the occupant of the vehicle 100 when engaging the cruise control system. The adaptive cruise control system could also include a lane keep assist feature, which not only adjusts the speed of the vehicle in relation to other vehicles or objects, but also functions to keep the vehicle 100 in its designated lane.

In another example, the generic navigation system 130 could also a free-space follow system that receives an input from a free-space estimation system. For example, the free-space estimation system can receive information from the perception sensor(s) 120 to determine the presence of free-space in front of the vehicle 100. Based on the presence of free-space in front of the vehicle 100, the free-space follow system can pilot the vehicle to follow another vehicle and/or the free-space.

The examples given above regarding the generic navigation system 130 are just examples. The generic navigation system 130 could take any one of several different forms, including elements of the examples given above, or other elements not specifically described.

The vehicle 100 may include one or more positioning sensors 140 that allow one or more systems or subsystems of the vehicle 100 to determine the position of the vehicle 100. For example, these positioning sensors could include sensors that measure acceleration, velocity, steering wheel angle, etc. of the vehicle 100. In one example, the positioning sensors 140 can include accelerometers, compass sensors, wheel speed sensors, steering angle sensors, combinations thereof, and the like.

The vehicle 100 may also include a global navigation satellite system (GNSS) 145. The GNSS 145 may be any type of global navigation satellite system, such as GPS (Global Positioning System), GLONASS (Global Navigation Satellite System), Galileo, and/or Beidou. The GNSS 145 receives signals from one or more satellites and, based on the signals received from the satellites, can determine the position of the vehicle 100. As will be explained later, the GNSS 145 may be utilized to determine the position of the vehicle 100 in relation to an intermediate target or an ultimate target.

The vehicle 100 may also include a route planning system 150 and a map database 160. The route planning system 150 can determine a route for the vehicle 100 to take to travel from an initial location to a destination. The route planning system 150 may receive an input of the destination from an occupant of the vehicle 100. The occupant of the vehicle 100 may utilize the input system 180 of the vehicle 100 to provide the destination information. The input system 180 of the vehicle 100 may be any type of input system that allows an occupant to input information. As such, the input system 180 could be a voice input microphone, touchscreen, keyboard, analog input, and the like.

After receiving the destination from the input system 180, the route planning system 150 may receive vehicle location information from the GNSS as 145. As such, after receiving this information, the route planning system 150 has both the initial location of the vehicle and the destination location. Using this information along with map information from the map database 160, the route planning system 150 may then be able to determine one or more routes from the initial location of the vehicle 100 to the destination location. In one example, these routes may be displayed along with directions to an output system 181, which could be a display and/or audible output device to provide instructions to guide the vehicle 100 to the destination.

The vehicle 100 may also include a vehicle motion controller 190 that is able to control one or more vehicle systems and subsystems that relate to the movement of the vehicle 100. For example, the vehicle motion controller 190 may communicate with an actuator controller 185 that actuates one or more systems that control the movement of the vehicle 100. For example, the actuator controller 185 may be able to control the pedal position, brakes, steering wheel angle, transmission selection, and the like. The vehicle motion controller 190 may receive information from the generic navigation system 130 to control the movement of the vehicle 100 by sending instructions to the actuator controller 185. For example, if the generic navigation system 130 is a lane keep assist system, the vehicle motion controller 190 may send signals to the actuator controller 185 to control the position of the vehicle 100 within a lane.

The vehicle 100 may also include a potential field imaging system 195. The potential field imaging system 195 may generate an artificial potential field image (sometimes referred to as a potential field image) using a methodology disclosed in U.S. patent application Ser. No. 16/502,602, entitled "Systems and Methods for Controlling an Autonomous Vehicle Using Target-Orientated Artificial Intelligence," which is hereby incorporated by reference in its entirety. An artificial potential field image is an imaginary potential field emitted by a "target state." A target state is a goal the system is trying to reach. For example, in autonomous driving navigation, the goal could be the destination location the vehicle is trying to reach. The potential field image is similar in concept to an electrical potential field in that the closer an object is to the potential source, the stronger the potential field is experienced by the object. In the case of the potential field image, the closer the vehicle 100 is to the target state, the stronger the potential is experienced by the vehicle 100. Intuitively, the potential experienced by the vehicle 100 represents how close the vehicle 100 graphically is to a goal location.

The representation of how close the vehicle 100 is to a target in a graphical form has several advantages, especially as it relates to improved computational performance. Recent advancements in graphics processing units (GPUs) allow GPUs to process large amounts of graphical data. With subsequent developments in artificial intelligence ("AI") libraries and frameworks that can process this large data, astonishingly accurate results can be achieved. As such, this allows for innovation in computer technology, namely digital image processing of a graphical form of how close the vehicle 100 is to a goal location, which in this case reflects both an improvement in the functioning of the computer and an improvement in the technology of target-orientated navigation.

Figure 3:
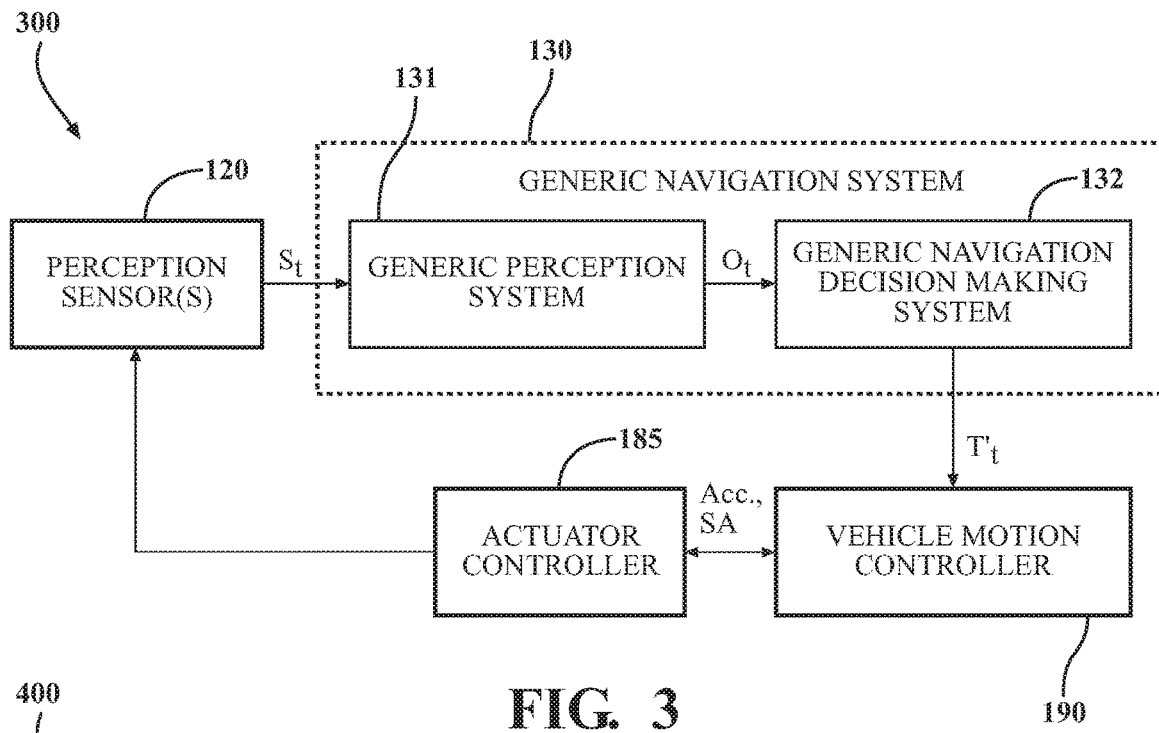
FIG. 3 illustrates a flow diagram of a traditional generic navigation system of a vehicle.

The vehicle 100 may also include a target-orientated navigation system 200. The target-orientated navigation system 200 can use generic components within the vehicle 100 to provide target-orientated navigation for the vehicle 100. More simply, the target-orientated navigation system 200 may use the generic perception system 131 of the generic navigation system 130 to provide target-orientated navigation for the vehicle 100. In order to provide a broad overview of how this occurs, reference is made to FIG. 3, which illustrates a traditional system flow 300 that utilizes the generic navigation system 130. Moreover, the traditional system flow 300 that provides information captured from the perception sensor(s) 120 to the generic navigation system 130. The generic perception system 131 of the generic navigation system 130 can convert information from the perception sensor(s) 120 to information that can be utilized by the generic navigation decision-making system 132. As stated before, the generic navigation decision-making system 132 could be a lane keep assist system that keeps the vehicle 100 within a lane. The generic navigation decision-making system 132 provides this information to a vehicle motion controller 190 that sends instructions to the actuator controller 185. The actuator controller 185, upon receiving instructions from the vehicle motion controller 190, controls one or more actuators that control the movement of the vehicle 100 to keep the vehicle 100 in a specified lane.

Figure 4:
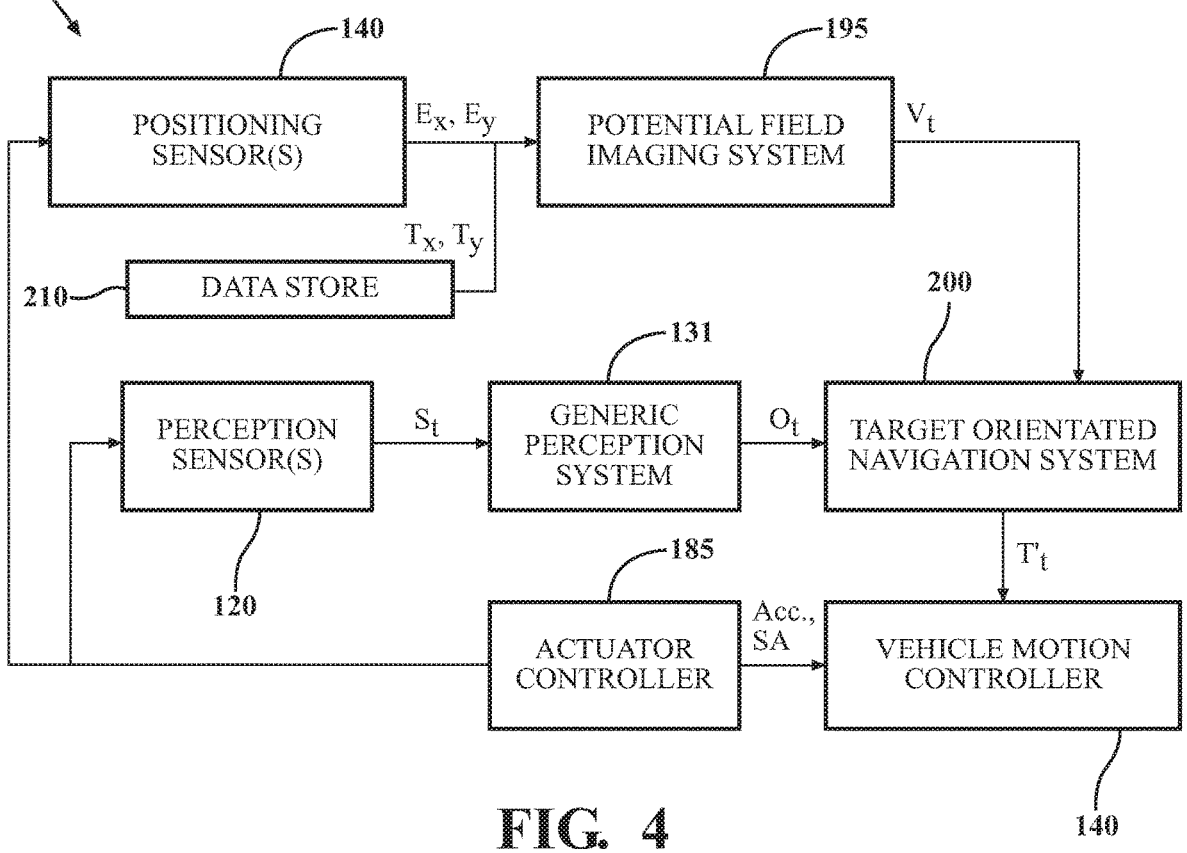
FIG. 4 illustrates a flow diagram of the target-orientated navigation system that utilizes components of the generic navigation system of a vehicle.

FIG. 4 illustrates a system flow 400 that includes a target-orientated navigation system 200 that utilizes generic components, such as the generic perception system 131 of the generic navigation system 130. Here, the target-orientated navigation system 200 receives the output of the generic perception system 131. By so doing, separate perception sensor(s) 120 and/or generic perception systems 131 do not need to be implemented to utilize the target-orientated navigation system 200. This may be advantageous, as additional sensors and perception systems are not required, which reduces the cost and complexity of the system. In the example shown in FIG. 4, the potential field imaging system 195 receives information from the positioning sensors 140 and/or a data store 210 to generate the potential field. As stated before, the generation of the potential field was described in U.S. patent application Ser. No. 16/502,602, entitled "Systems and Methods for Controlling an Autonomous Vehicle Using Target-Orientated Artificial Intelligence" which, as noted previously, is incorporated by reference in its entirety. The potential field is then provided to the target-orientated navigation system 200.

The target-orientated navigation system 200 also receives information from the generic perception system 131. As will be explained in greater detail later in this specification, the target-orientated navigation system 200 uses information from the generic perception system 131 to determine a collision probability array. Each of the cells of the collision probability array indicates the likelihood of a collision if the vehicle 100 is piloted towards a location that corresponds with the cell of the collision probability array. The target-orientated navigation system 200 can determine which cells of the collision probability array satisfies a safety criteria. The safety criteria may be such that the possibility that the vehicle 100 collides with another object is extremely low, such as less than 5%.

The target-orientated navigation system 200 considers the cells of the collision probability array that satisfy a safety criteria along with the artificial potential field array. The artificial potential field array is an array of cells that represent the closeness of the vehicle 100 to a destination. The target-orientated navigation system 200 generates an objective score array that includes a plurality of cells that have values that represent where the vehicle 100 should be piloted towards that satisfy both the collision probability array (the safety of the vehicle) and the artificial potential field (the destination where the vehicle wishes to travel). The vehicle motion controller 190 can actuate actuators via the actuator controller 185 to pilot the vehicle 100 towards the cell of the objective score array that has the most desirable score. As such, the target-orientated navigation system 200 provides a cost-effective solution for providing autonomous navigation of the vehicle using generic hardware components, such as the generic perception system 131 of the generic navigation system 130.

Figure 2:
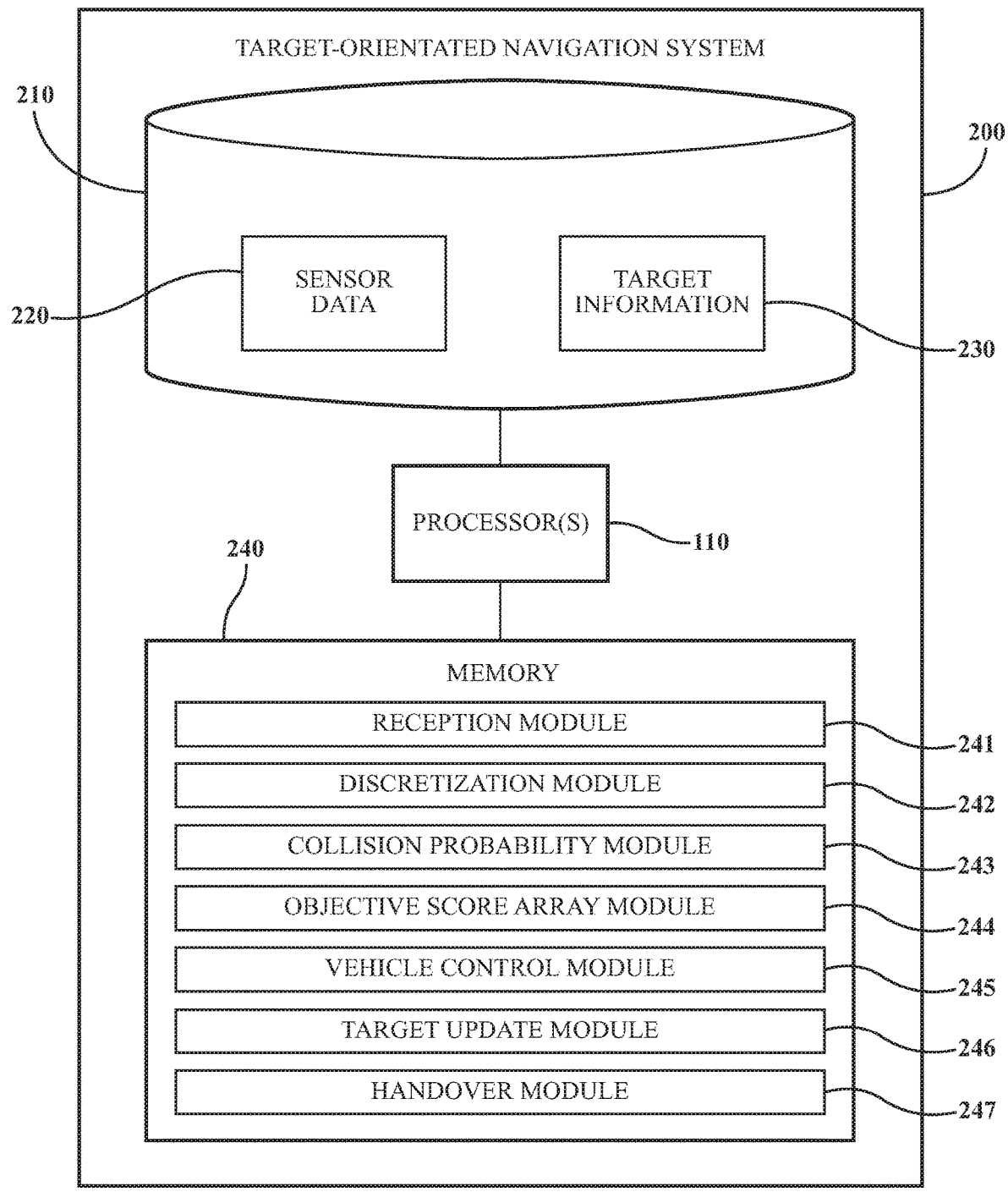
FIG. 2 is a more detailed block diagram of the target-orientated navigation system of FIG. 1.

With reference to FIG. 2, one embodiment of the target-orientated navigation system 200 is further illustrated. As shown, the target-orientated navigation system 200 includes a processor(s) 110. Accordingly, the processor(s) 110 may be a part of the target-orientated navigation system 200, or the target-orientated navigation system 200 may access the processor(s) 110 through a data bus or another communication pathway. In one or more embodiments, the processor(s) 110 is an application-specific integrated circuit that is configured to implement functions associated with a reception module 241, a discretization module 242, a collision probability module 243, an objective score array module 244, a vehicle control module 245, a target update module 246, and/or a handover module 247. More generally, in one or more aspects, the processor(s) 110 is an electronic processor, such as a microprocessor that can perform various functions as described herein when loading the modules 241-247 and executing encoded functions associated therewith.

In one embodiment, the target-orientated navigation system 200 includes a memory 240 that stores the modules 241-247. The memory 240 is a random-access memory (RAM), read-only memory (ROM), a hard disk drive, a flash memory, or other suitable memory for storing the modules 241-247. The modules 241-247 are, for example, computer-readable instructions that, when executed by the processor(s) 110, cause the processor(s) 110 to perform the various functions disclosed herein. While, in one or more embodiments, the modules 241-247 are instructions embodied in the memory 240, in further aspects, the modules 241-247 include hardware, such as processing components (e.g., controllers), circuits, etc. for independently performing one or more of the noted functions.

Furthermore, in one embodiment, the target-orientated navigation system 200 includes a data store 210. The data store 210 is, in one embodiment, an electronically based data structure for storing information. In at least one approach, the data store 210 is a database that is stored in the memory 240 or another suitable medium, and that is configured with routines that can be executed by the processor(s) 110 for analyzing stored data, providing stored data, organizing stored data, and so on. In either case, in one embodiment, the data store 210 stores data used by the modules 241-247 in executing various functions. In one embodiment, the data store 210 includes sensor data 220 that may be data collected by the perception sensor(s) 120 and/or processed by the generic perception system 131. The data store 210 may also include target information 230, which may include intermediate and/or ultimate target information for the vehicle 100 and/or current position information of the vehicle 100.

Figure 5A:
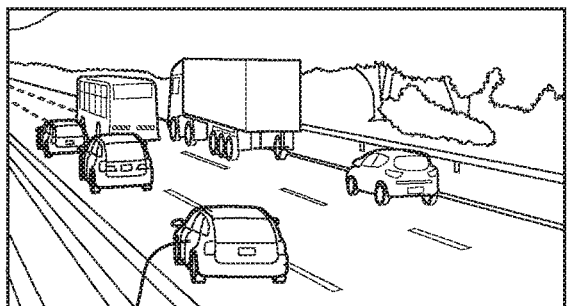
FIGS. 5A-5G illustrate an example scenario of a vehicle utilizing the target-orientated navigation system.
Figure 5B:
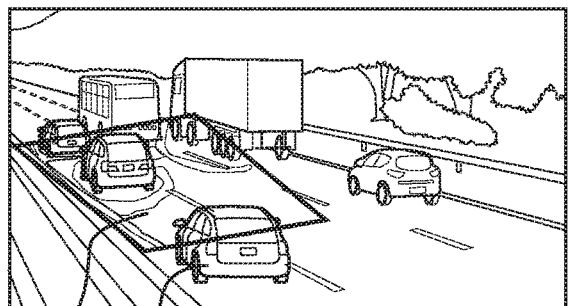

With regards to the modules 241-247, the reception module 241 may include instructions that, when executed by the processor(s) 110, causes the processor(s) 110 to receive perception data from the generic perception system 131 of the vehicle 100. The perception data from the generic perception system 131 may be in the form of one or more images, points clouds, sonar data and/or radar data or could be processed data that provides information regarding the presence of one or more objects located in the one or more images, points clouds, sonar data and/or radar data. For example, referring to FIG. 5A, this figure illustrates the vehicle 100 traveling on the road that also includes other vehicles traveling on the same road. In FIG. 5B, the perception data 501 is in the form of information regarding the presence of one or more objects in relation to the vehicle 100.

Figure 5C:
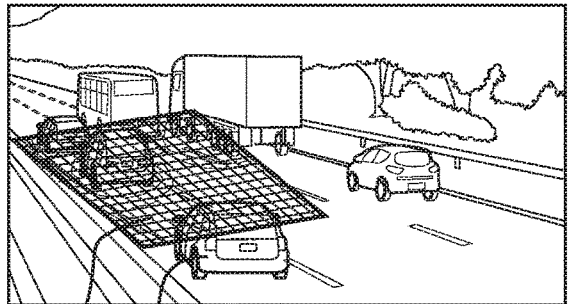

The discretization module 242 may include instructions that, when executed by the processor(s) 110, causes the processor(s) 110 to discretize the perception data into an area adjacent to a current position of the vehicle 100. Moreover, as best shown in FIG. 5C, the perception data 501 of FIG. 5B has been discretized into a plurality of lattices 502. The discretization module 242 may further include instructions that when executed by the processor(s) 110 cause the processor(s) 110 to divide the area adjacent to a current position of the vehicle 100 into K-by-K area in front the vehicle 100 of into a grid having the plurality of lattices along two or more axes.

Figure 5D:
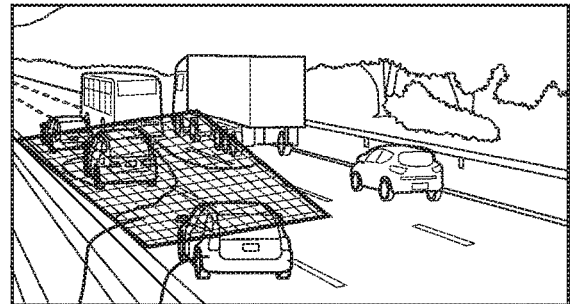

The collision probability module 243 may include instructions that, when executed by the processor(s) 110, cause the processor(s) 110 to generate a collision probability array having a plurality of cells that correspond to the plurality of lattices 502. The cells of the collision probability array indicate a likelihood of a collision if the vehicle 100 moves to the area represented by the cells of the collision probability array and determine which cells of the collision probability array satisfy a safety criteria. For example, referring to FIG. 5D, illustrated is a collision probability array 503. The collision probability array 503 includes a portion of cells that are shaded to indicate that they satisfy safety criteria. The safety criteria could be such that the vehicle 100 is unlikely to collide with another object if the vehicle 100 moves to a position represented by one or more cells that satisfy the safety criteria of the collision probability array 503. As such, the shaded area of the collision probability array 503 indicates cells that satisfy the safety criteria and that the vehicle 100 is unlikely to collide with any other object if the vehicle 100 moves to the position represented by the cells that satisfy the safety criteria.

Figure 5E:
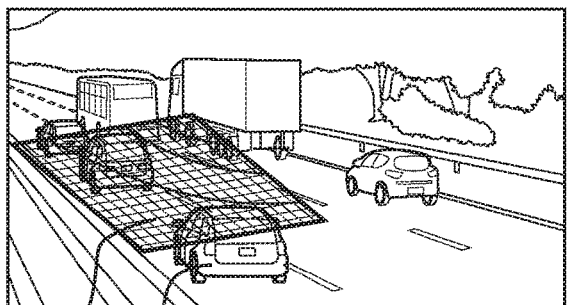

The reception module 241 may also include instructions that, when executed by the processor(s) 110, cause the processor(s) 110 to receive the artificial potential field array. For example, referring to FIG. 5E, illustrated is an artificial potential field array 504, indicating a target where the vehicle 100 wishes to travel to. As stated before, the artificial potential field array is an array of cells that represent the closeness of the vehicle 100 to a destination. The values for the plurality of cells of the artificial potential field array being a function of the proximity of the current position of the vehicle 100 from a target position or destination. The destination can be an intermediate target or can be an ultimate target. An intermediate target is a destination located between the current position of the vehicle and the ultimate target. The intermediate target may serve as a steppingstone to the ultimate target.

Figure 5F:
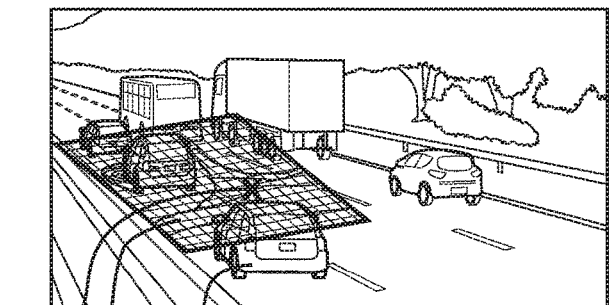

The objective score array module 244 may include instructions, that when executed by the processor(s) 110, cause the processor(s) 110 to generate an objective score array having a plurality of cells corresponding to the cells of the collision probability array that satisfied the safety criteria. The values for the cells of the objective score array are based on the values of corresponding cells of the collision probability array and the artificial potential field array. For example, referring to FIG. 5F, illustrated is an objective score array 505 that includes cells that have values based on corresponding cells of the collision probability array 503 and the artificial potential field array 504. Also illustrated is a location 506, represented by a cell that is determined to have the most desirable value. The most desirable value represents a location where the vehicle 100 should travel to avoid colliding with another object but also move towards the intermediate or ultimate target. The most desirable value may be a high value but could also be a low value.

The values for the plurality of cells of the objective score array may be:

$$o_i = \beta * s'_i + (1-\beta) * \varphi'_i;$$

$$\beta \in [0,1]; \text{ and}$$

wherein $o_i$ are the values for the plurality of cells of the objective score array, $\varphi'_i$ are the values for the plurality of cells of the artificial potential field array, $s'_i$ are the values for the plurality of cells of the collision probability array, and $\beta$ is an aggression factor that represents a relative importance of safety. The cell in the objective score array that has the highest value is expressed as:

$$T'_t = \underset{i}{\mathrm{argmax}}\, oi.$$

Figure 5G:
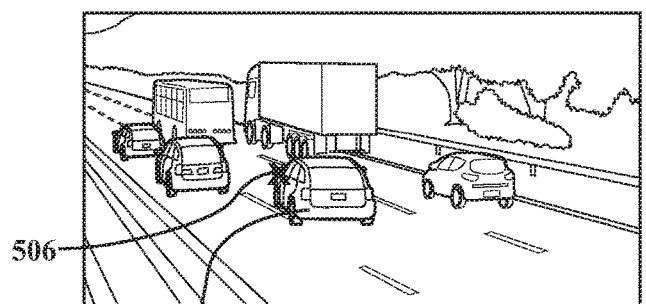

The vehicle control module 245 may include instructions that, when executed by the processor(s) 110, cause the processor(s) 110 to direct the vehicle motion controller 190 of the vehicle 100 to guide the vehicle 100 to a location representative of a cell in the objective score array that has the highest value. For example, referring to FIGS. 5F and 5G, the vehicle motion controller 190 of the vehicle 100 guides the vehicle 100 to a location 506 that is representative of the most desirable value of the objective score array 505. As such, the target-orientated navigation system 200 can pilot the vehicle 100 towards a target that satisfies both the collision probability array 503 (the safety of the vehicle) and the artificial potential field array 504 (the destination where the vehicle wishes to travel).

The target update module 246 may include instructions that, when executed by the processor(s) 110, cause the processor(s) 110 to update the target position to a new target position when the vehicle 100 has reached the target position. For example, referring to FIG. 5G, after the vehicle has reached the location 506, the target-orientated navigation system 200 may perform the methodologies disclosed above again to determine a new target position for the vehicle 100 to travel to. As such, the target-orientated navigation system 200 can determine an ultimate target to travel to, and then, using the route planning system 150 can determine a route. The route can be broken up into intermediary targets that represent locations for the vehicle 100 to travel to. As the vehicle travels from one intermediate target to another, the vehicle 100 gets closer and closer to its ultimate target.

Figure 6:
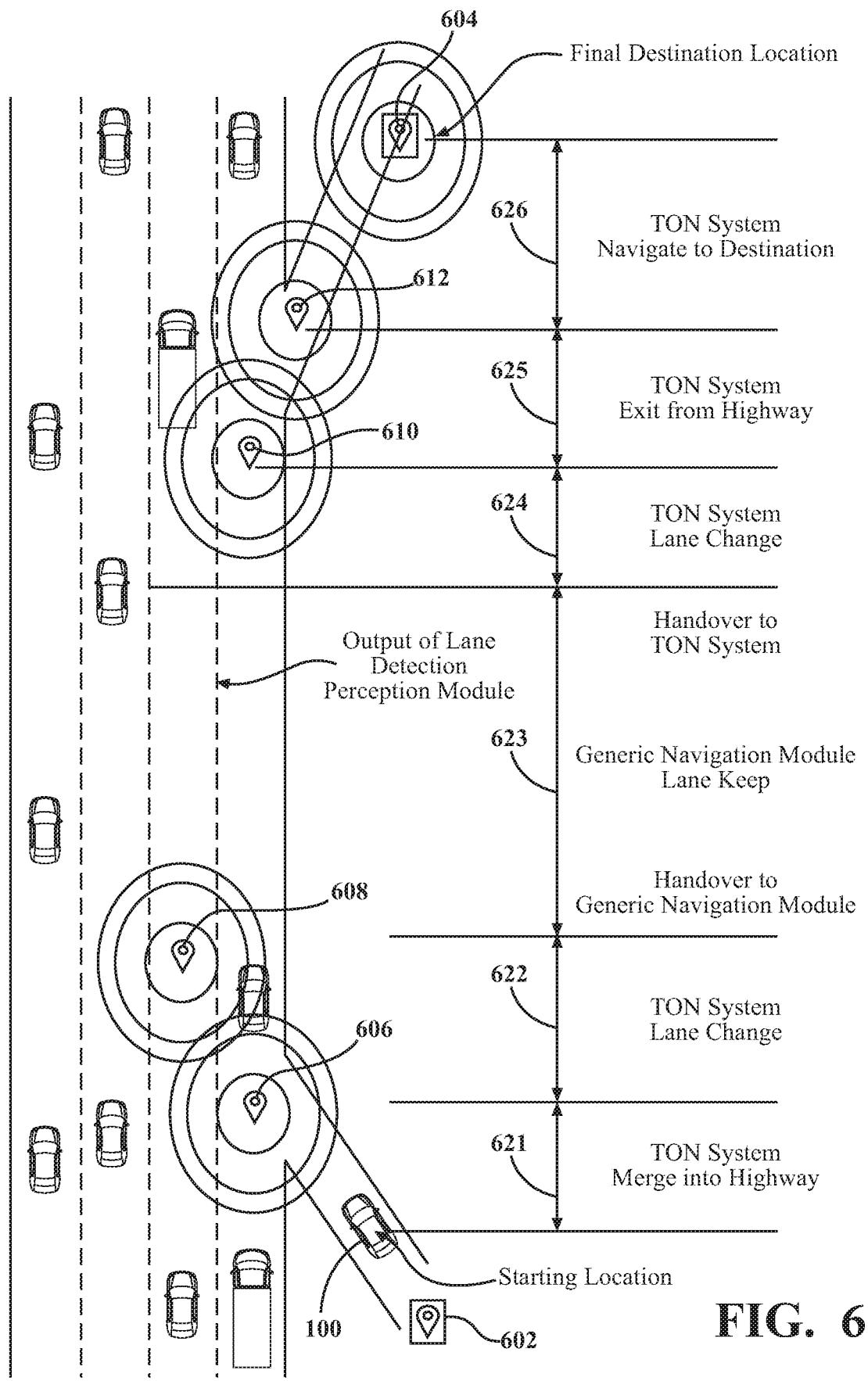
FIG. 6 illustrates an example scenario of a vehicle utilizing the target-orientated navigation system that performs handover operations between the target-orientated navigation system and a generic navigation system.

For example, FIG. 6, illustrates vehicle 100 has a starting location 602 and an ultimate target 604. As such, the starting location 602 is where the vehicle 100 starts, and then the ultimate target 604 is where the destination of the vehicle 100 ends. Here, the route planning system 150 of the vehicle 100 has devised a route along the road. The route includes several intermediate targets 606, 608, 610, 612. Here, the intermediate target 606 may represent the center of an artificial potential field. As described earlier, the target-orientated navigation system 200 utilizes the artificial potential field along with information from the generic navigation system to pilot the vehicle to a target, in this case, the intermediate target 606. After the intermediate target 606 is reached, the target-orientated navigation system 200 adds another intermediate target 608. After reaching the intermediate target 608, the target-orientated navigation system then sets course for the intermediate target 610, followed by the intermediate target 612, and finally to the ultimate target 604.

The handover module 247 may include instructions that, when executed by the processor(s) 110, cause the processor(s) 110 to handover control between the target-orientated navigation system 200 and the generic navigation system 130 of the vehicle 100. Moreover, still referring to FIG. 6, the route to the ultimate target 604 from the starting location 602 may be broken up into intermediate targets 606, 608, 610, and 612, each of which has an artificial potential field surrounding it. Depending on where the vehicle 100 is located along the route, either the target-orientated navigation system 200 may control the vehicle 100 or the generic navigation system 130 may control the vehicle 100.

For example, the route shown in FIG. 6 includes a time period 621 between the starting location 602 in the intermediate target 606. During this stretch (time periods 621 and 622), the handover module 247 may cause the processor(s) 110 to determine that the target-orientated navigation system 200 should be in control of the vehicle 100. This may be because the vehicle 100 is merging onto a highway that has numerous vehicles located on the highway and that the target-orientated navigation system can manage a highway entrance, while the generic navigation system 130, which may be simply a lane keep system, generally cannot.

As the vehicle 100 continues along the route, the vehicle will eventually reach the intermediate target 608. At intermediate target 608, the handover module 247 may cause the processor(s) 110 to determine that, because the vehicle 100 is traveling along a straight road, the target-orientated navigation system 200 is no longer necessary and the generic navigation system 130 can be utilized instead (time period 623). Here, because the vehicle 100 is simply traveling along a straight road, the handover module 247 may cause the processor(s) 110 to determine that the lane keep assist system is adequate for piloting the vehicle along the lane of the road.

As the vehicle 100 continues along a roadway towards the intermediate target 610, the handover module 247 may cause the processor(s) 110 to determine that the target-orientated navigation system 200 should take over command of the vehicle 100 from the generic navigation system 130 (time periods 624, 625, and 626). Here, because the vehicle 100 is now changing lanes and moving towards an exit ramp which leads to the ultimate target 604, the handover module 247 may cause the processor(s) 110 to determine that the target-orientated navigation system 200, which considers both the safety of the vehicle 100 and the destination where the vehicle 100 wishes to travel to, should now have control the vehicle 100.

As such, the handover module 247 causes the processor(s) 110 to determine situations wherein the generic navigation system 130 of the vehicle is adequate in piloting the vehicle 100 and other situations wherein the target-orientated navigation system 200 should be utilized to pilot the vehicle 100. In the examples mentioned above, the generic navigation system 130 may be utilized when the vehicle 100 is traveling along a straight roadway or otherwise intends to stay in the same lane. However, when the vehicle 100 needs to perform more complex maneuvers so to reach the ultimate target or intermediate targets, the handover module 247 may cause the processor(s) 110 to turn over control of the vehicle 100 to the target-orientated navigation system 200.

Figure 7:
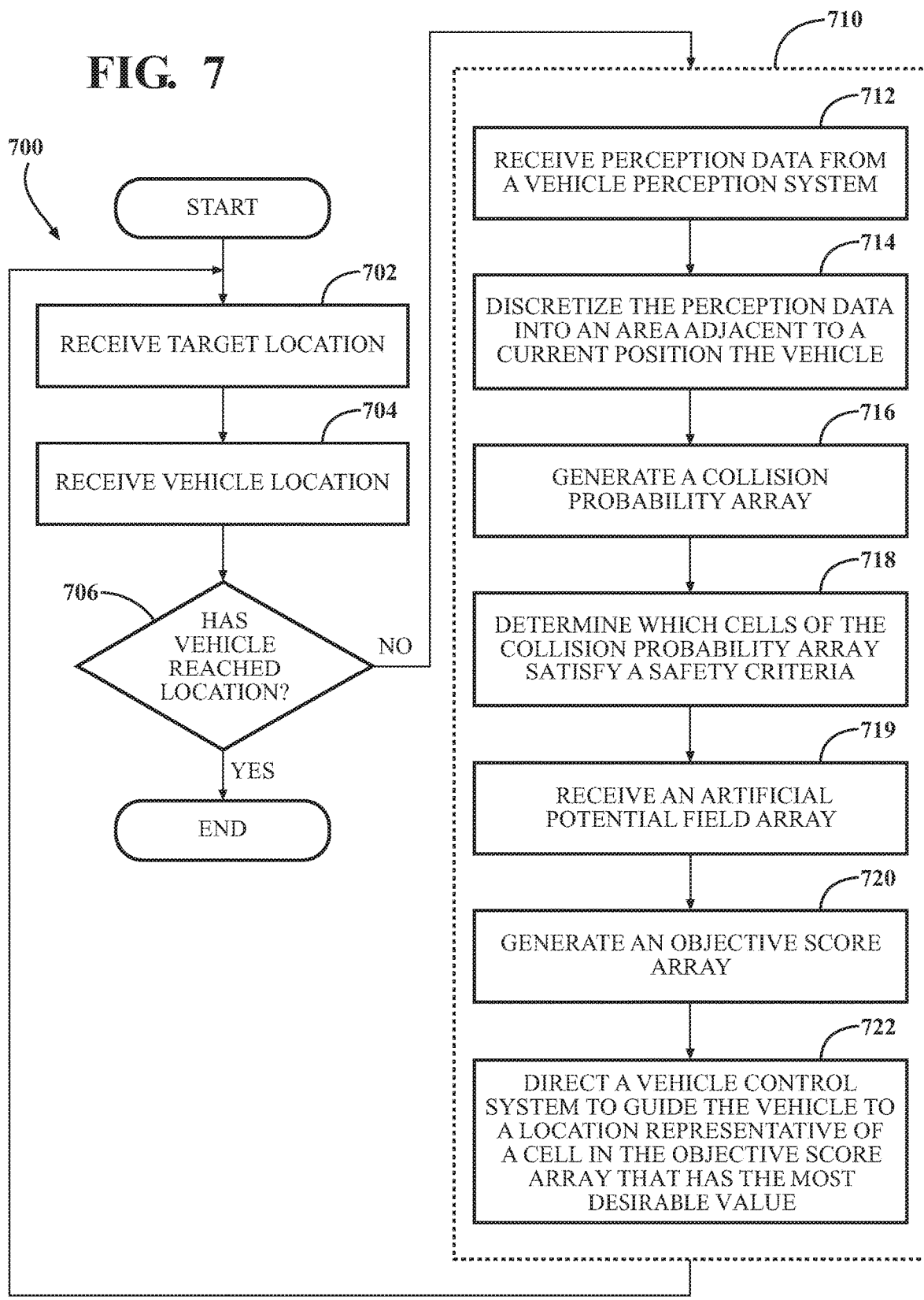
FIG. 7 illustrates a method for utilizing a target-orientated navigation system with a generic navigation system.

FIG. 7 illustrates a method 700 for a vehicle having a generic navigation control system and a target-orientated navigation system. The method 700 will be described from the viewpoint of the vehicle 100 of FIG. 1 and the target-orientated navigation system 200 of FIG. 2. However, the method 700 may be adapted to be executed in any one of several different situations and not necessarily by the vehicle 100 of FIG. 1 and/or the target-orientated navigation system 200 of FIG. 2.

Here, the method 700 begins at step 702, wherein the target update module 246 causes the processor(s) 110 to receive a target location. The target location may be an intermediate target location between a beginning of a route and an end of a route or may be an ultimate target, representing the end of the route. In step 704, the reception module 241 causes the processor(s) 110 to receive the location of the vehicle 100. The location of the vehicle 100 may be generated by the GNSS 145 of the vehicle 100.

In step 706, the target update module 246 causes the processor(s) 110 to determine if the vehicle 100 has reached the location indicated in step 702. This can be done by comparing the target location to the vehicle location. If there is a substantial match, the method 700 may end. However, if the vehicle has not reached the target location, the method proceeds to method 710. The method 710 relates to a series of steps for utilizing the target-orientated navigation system 200. The method 710 may include all the steps 712-722 or a subset of steps. Further, the method 710 may not be executed in the order described.

Here, the method 710 begins at step 712, wherein the reception module 241 causes the processor(s) 110 to receive perception data from the generic perception system 131 of the vehicle 100. As described earlier, the perception data could include information regarding one or more objects external to the vehicle 100.

In step 714, the discretization module 242 causes the processor(s) 110 to discretize the perception data into an area adjacent to the current position of the vehicle 100. Moreover, as best shown in FIG. 5C, the perception data 501 of FIG. 5B has been discretized to into a plurality of lattices 502. The discretization module 242 may further include instructions that when executed by the processor(s) 110 cause the processor(s) 110 to divide the area adjacent to a current position of the vehicle 100 into K-by-K area in front of the vehicle 100 into a grid of having the plurality of lattices along two or more axes.

In step 716, the collision probability module 243 causes the processor(s) 110 to generate a collision probability array having a plurality of cells that correspond to the plurality of lattices. The cells of the collision probability array indicate a likelihood of a collision if the vehicle 100 moves to the area represented by the cells of the collision probability array and determine which cells of the collision probability array satisfy a safety criteria. For example, referring to FIG. 5D, illustrated is a collision probability array 503.

In step 718, the collision probability module 243 causes the processor(s) 110 to determine which cells of the collision probability array satisfy safety criteria. The collision probability array 503 includes a portion of cells that are shaded to indicate that they satisfy safety criteria. The safety criteria could be such that the vehicle 100 is unlikely to collide with another object if the vehicle 100 moves to a position represented by one or more cells that satisfy the safety criteria of the collision probability array 503. As such, the shaded area of the collision probability array 503 indicates cells that satisfy the safety criteria and that the vehicle 100 is unlikely to collide with any other object if the vehicle 100 moves to the position represented by the cells that satisfy the safety criteria.

In step 719, the reception module 241 may cause the processor(s) 110 to receive an artificial potential field array. As stated before, the artificial potential field array is an array of cells that represent the closeness of the vehicle 100 to a destination. The values for the plurality of cells of the artificial potential field array being a function of the proximity of the current position of the vehicle 100 from a target position or destination. The destination can be an intermediate target or can be an ultimate target.

In step 720, the objective score array module 244 may cause the processor(s) 110 to generate an objective score array. The objective score array may include a plurality of cells corresponding to the cells of the collision probability array that satisfied the safety criteria. The values for the cells of the objective score array are based on the values of corresponding cells of the collision probability array and the artificial potential field array. For example, referring to FIG. 5F, illustrated is an objective score array 505 that includes cells that have values based on corresponding cells of the collision probability array 503 and the artificial potential field array 504. Also illustrated is a location 506, represented by a cell, that is determined to have the most desirable value. The most desirable value represents a location where the vehicle 100 should travel to avoid colliding with another object but also move towards the intermediate or ultimate target. The most desirable value may be a high value but could also be a low value.

In step 722, the vehicle control module 245 causes the processor(s) 110 to direct the vehicle motion controller 190 of the vehicle 100 to guide the vehicle 100 to a location representative of a cell in the objective score array that has the highest value. For example, referring to FIGS. 5F and 5G, the vehicle motion controller 190 of the vehicle 100 guides the vehicle 100 to a location 506 that is representative of the most desirable value of the objective score array 505. As such, the target-orientated navigation system 200 can pilot the vehicle 100 towards a target that satisfies both the collision probability array 503 (the safety of the vehicle) and the artificial potential field array 504 (the destination where the vehicle wishes to travel).

After the method 710 has been completed, the method 700 returns to step 702, where the process starts again. In this example, the target location received after completing the method 700 may be a new target location.

Figure 8:
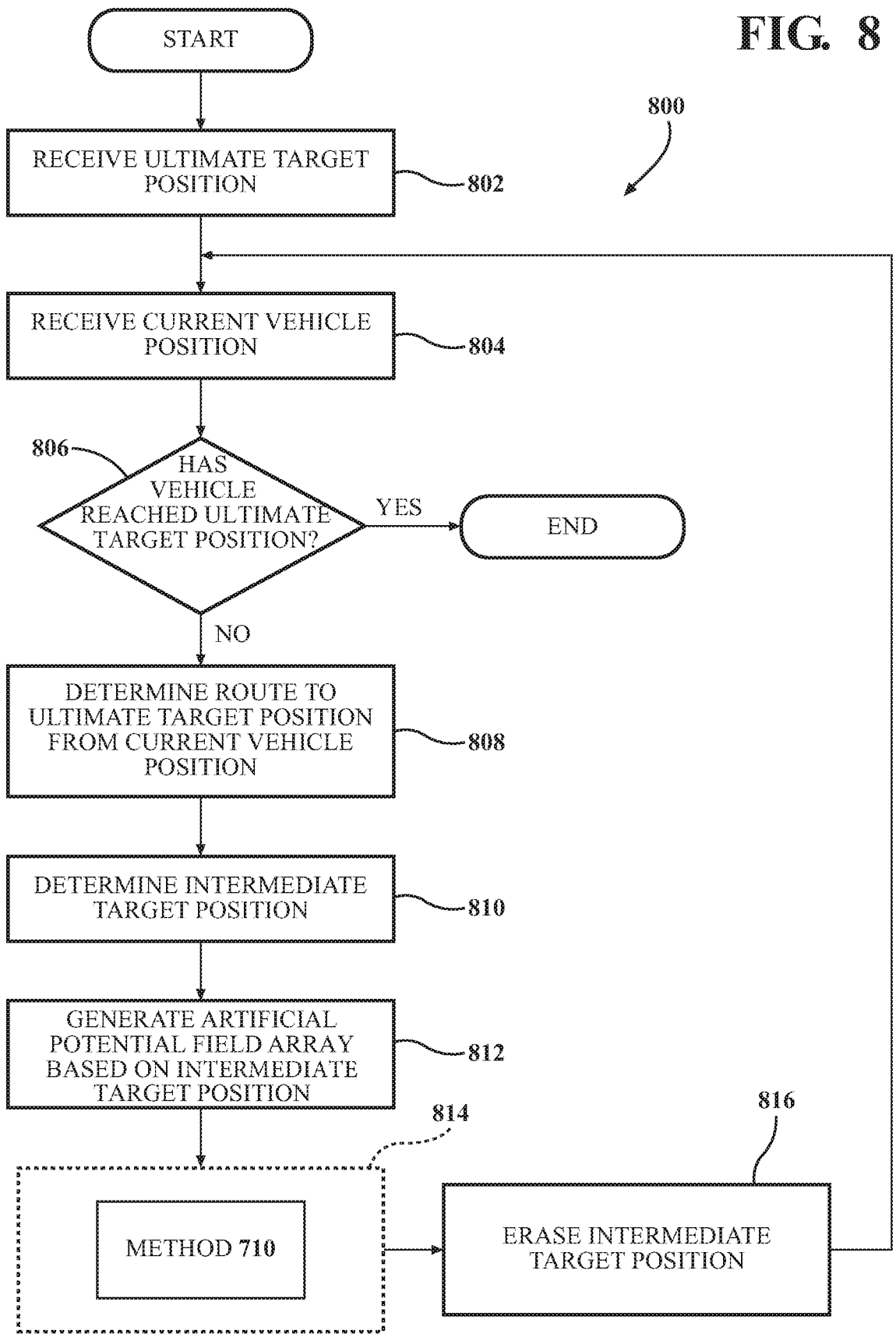
FIG. 8 illustrates a method for utilizing a target-orientated navigation system with a generic navigation system to reach an ultimate target position using intermediate target positions.

Referring to FIG. 8, another method 800 for a vehicle having a generic navigation control system and a target-orientated navigation system. The method 800 will be described from the viewpoint of the vehicle 100 of FIG. 1 and the target-orientated navigation system 200 of FIG. 2. However, the method 800 may be adapted to be executed in any one of several different situations and not necessarily by the vehicle 100 of FIG. 1 and/or the target-orientated navigation system 200 of FIG. 2.

The method 800 describes a methodology for utilizing an ultimate target and a series of intermediate targets that ultimately lead to the ultimate target like what was shown and described in FIG. 6. Here, the method 800 begins at step 802, wherein the target update module 246 causes the processor(s) 110 to receive an ultimate target position. The ultimate target position may be provided by the occupant of the vehicle 100 via the input system 180. In step 804, the target update module 246 causes the processor(s) 110 to receive a current vehicle position. The current vehicle position may be provided by the GNSS 145.

In step 806, the target update module 246 causes the processor(s) 110 to determine if the vehicle 100 has reached the ultimate target. If the vehicle 100 has reached the ultimate target, the method 800 ends. Otherwise, the method proceeds to step 808. In step 808, the target update module 246 causes the processor(s) 110 to determine a route to the ultimate target position from the current vehicle position. This may be performed by the route planning system 150 that utilizes the ultimate target, the current vehicle position, and maps from the map database 160 to generate a route for the vehicle 100 to travel upon to reach the ultimate target. Further, the processor(s) 110 may also determine one or more intermediate target positions, as shown in step 810.

In step 812, the reception module 241 receives an artificial potential field array based on the target position. The target position may be the intermediate target position or may be the ultimate target. As stated before, the artificial potential field array may be generated as described in U.S. patent application Ser. No. 16/502,602, entitled "Systems and Methods for Controlling an Autonomous Vehicle Using Target-Orientated Artificial Intelligence" which, as noted previously, is incorporated by reference in its entirety.

In step 814, the method 710 of FIG. 7 is performed. As stated before, the method 710 of FIG. 7 is able to utilize the artificial potential field array as well as information from the generic perception system 131 of the generic navigation system 130 of the vehicle 100 to guide the vehicle 100 to a target.

In step 816, once the vehicle 100 has reached the intermediate target position, the intermediate target position may be erased and the method 800 and returns to step 804, where the method 800 determines the current vehicle position and determines if the vehicle has reached the ultimate target. As stated before, if the vehicle has reached the ultimate target, the method 800 ends, otherwise, the method 800 continues until the vehicle reaches the ultimate target.

Figure 9:
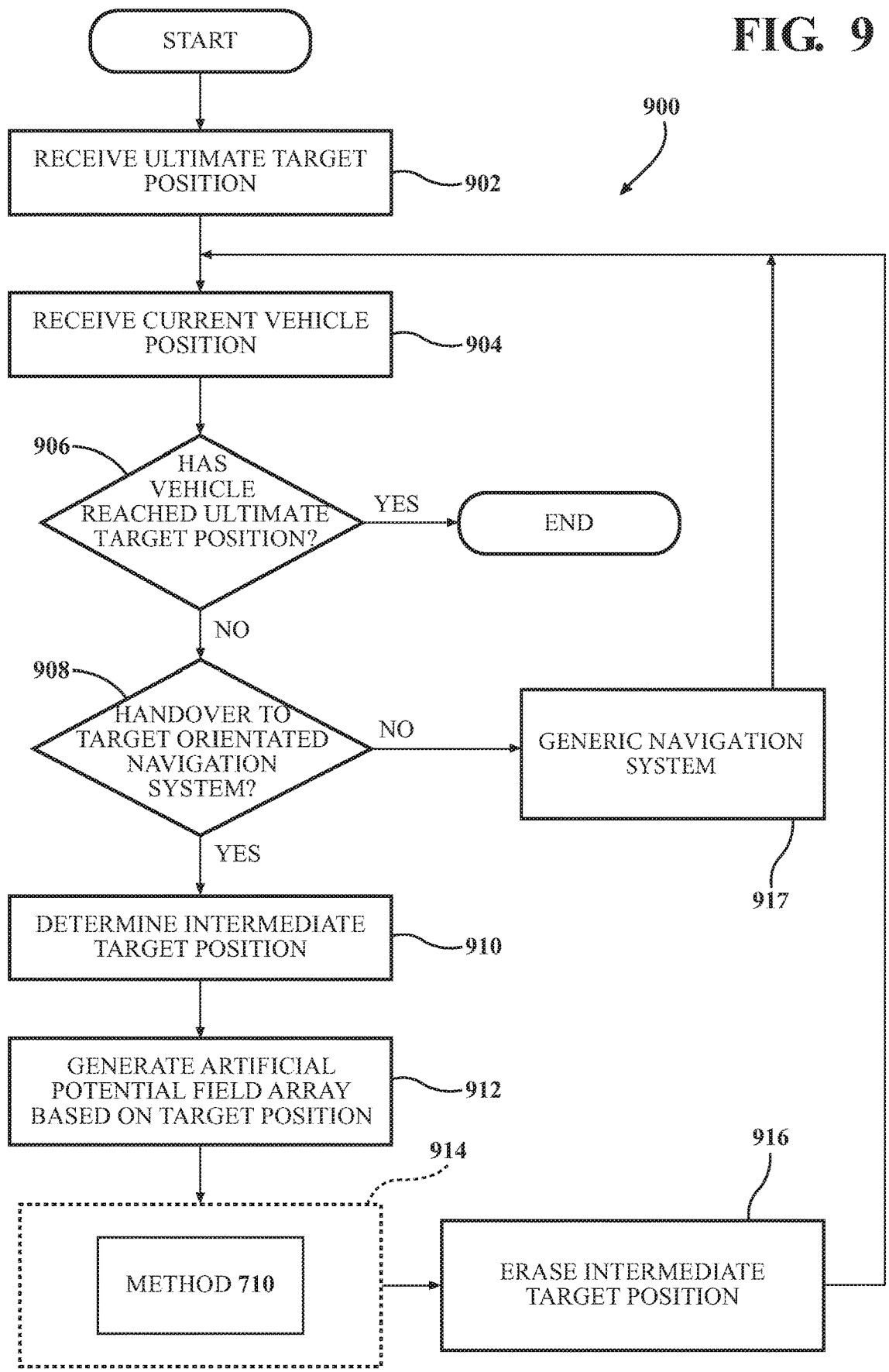
FIG. 9 illustrates a method for utilizing a target-orientated navigation system with a generic navigation system that performs handover operations between the target-orientated navigation system and the generic navigation system.

Referring to FIG. 9, another method 900 for a vehicle having a generic navigation control system and a target-orientated navigation system. The method 900 will be described from the viewpoint of the vehicle 100 of FIG. 1 and the target-orientated navigation system 200 of FIG. 2. However, the method 900 may be adapted to be executed in any one of several different situations and not necessarily by the vehicle 100 of FIG. 1 and/or the target-orientated navigation system 200 of FIG. 2.

The method 900 is somewhat like the method 800 of FIG. 8. As such, similar steps will be described briefly with the understanding that the previous description is equally applicable for the method 900. Here, the target update module 246 causes the processor(s) 110 to receive the ultimate target position and the current vehicle position, as indicated in step 902 and 904, respectively. If the vehicle 100 has reached the ultimate target, the method 900 ends.

However, if the ultimate target is not yet been reached, as determined in step 906, the method 900 proceeds to step 908. In step 908, the handover module 247 causes the processor(s) 110 to decide if control of the vehicle 100 should be handed over to the target-orientated navigation system 200 from the generic navigation system 130 or vice versa. For example, if the vehicle 100 is traveling on a straight road, the method 900 may decide that is more appropriate for the generic navigation system 130 to pilot the vehicle 100 down the road and will proceed to step 917.

However, if the handover module 247 causes the processor(s) 110 to determine that a more complex maneuver is required by the vehicle 100, the method 900 may proceed to step 910, wherein control of the vehicle 100 is handed over to the target-orientated navigation system 200 and an intermediate target position is determined. Thereafter, in step 912, as described for, and artificial potential field array is based on the target position of 910, and the method 710 is performed, as indicated in step 914. after the method 710 is performed, the intermediate target position may be erased, as indicated in step 916, and the method returns to step 904.

it should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein, and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A target-orientated navigation system for a vehicle having a generic navigation system, the target-orientated navigation comprising:

one or more processors; and a memory in communication with the one or more processors, the memory comprising:

a reception module having instructions that when executed by the one or more processors cause the one or more processors to receive perception data from a vehicle perception system of the vehicle, a discretization module having instructions that when executed by the one or more processors cause the one or more processors to discretize the perception data into an area adjacent to a current position of the vehicle, the area comprising a plurality of lattices;

a collision probability module having instructions that when executed by the one or more processors cause the one or more processors to generate a collision probability array having a plurality of cells that correspond to the plurality of lattices, the cells of the collision probability array indicating a likelihood of a collision if the vehicle moves to the area represented by the cells of the collision probability array and determine which cells of the collision probability array satisfy a safety criteria;

the reception module having instructions that when executed by the one or more processors cause the one or more processors to receive an artificial potential field array having a plurality of cells that correspond to the plurality of cells of the collision probability array, values for the plurality of cells of the artificial potential field array being a function of a proximity of the current position of the vehicle from a target position;

an objective score array module having instructions that when executed by the one or more processors cause the one or more processors to generate an objective score array having a plurality of cells corresponding to the cells of the collision probability array that satisfied the safety criteria, wherein the values for the cells of the objective score array are based on the values of corresponding cells of the collision probability array and the artificial potential field array;

a vehicle control module having instructions that when executed by the one or more processors cause the one or more processors to direct a vehicle control system of the vehicle to guide the vehicle to a location representative of a cell in the objective score array that has a highest value;

wherein the values for the plurality of cells of the objective score array are:

$$o_i = \beta * s'_i + (1-\beta) * \varphi'_i;$$

$\beta \in [0,1]$; and wherein $o_i$ are the values for the plurality of cells of the objective score array, $\varphi'_i$ are the values for the plurality of cells of the artificial potential field array, $s'_i$ are the values for the plurality of cells of the collision probability array, and $\beta$ is an aggression factor that represents a relative importance of safety.

2. The target-orientated navigation system of claim 1, wherein the discretization module further includes instructions that when executed by the one or more processors cause the one or more processors to divide the area adjacent to a current position of the vehicle into K-by-K area in front of into a grid of having the plurality of lattices along two or more axes.

3. The target-orientated navigation system of claim 1, wherein the collision probability module further includes instructions that when executed by the one or more processors cause the one or more processors to invert the values of the plurality of cells of the collision probability array to determine which cells of the collision probability array satisfy the safety criteria.

4. The target-orientated navigation system of claim 1, wherein a cell in the objective score array that has a highest value is expressed as:

$$T'_t = \underset{i}{\mathrm{argmax}}\, o_i.$$

5. The target-orientated navigation system of claim 1, wherein the memory further comprises a target update module comprising instructions that when executed by the one or more processors cause the one or more processors to update the target position to a new target position when the vehicle has reached the target position.

6. The target-orientated navigation system of claim 5, wherein the new target position is determined based on a route to an ultimate target position.

7. The target-orientated navigation system of claim 1, wherein the memory further comprises a handover control module comprising instructions that when executed by the one or more processors cause the one or more processors to:
determine a location of the vehicle along a route, and
directing, by a handover control system, the vehicle control system to utilize commands from either the target-orientated navigation system or the generic navigation system based on the location of the vehicle along the route.

8. A method for operating a vehicle having a generic navigation control system and a target-orientated navigation system, the method comprising the steps of:
receiving perception data from a vehicle perception system of the vehicle;
discretizing, by the target-orientated navigation system, the perception data into an area adjacent to a current position of the vehicle, the area comprising a plurality of lattices;
generating, by the target-orientated navigation system, a collision probability array having a plurality of cells that correspond to the plurality of lattices, the cells of the collision probability array indicating a likelihood of a collision if the vehicle moves to the area represented by the cells of the collision probability array;
determining, by the target-orientated navigation system, which cells of the collision probability array satisfy a safety criteria;
receiving, by the target-orientated navigation system, an artificial potential field array having a plurality of cells that correspond to the plurality of cells of the collision probability array, values for the plurality of cells of the artificial potential field array being a function of a proximity of the current position of the vehicle from a target position;
generating, by the target-orientated navigation system, an objective score array having a plurality of cells corresponding to the cells of the collision probability array that satisfied the safety criteria, wherein the values for the cells of the objective score array are based on the values of corresponding cells of the collision probability array and the artificial potential field array;
directing, by the target-orientated navigation system, a vehicle control system of the vehicle to guide the vehicle to a location representative of a cell in the objective score array that has a highest value;
wherein the values for the plurality of cells of the objective score array are:

$$o_i = \beta * s'_i + (1-\beta) * \varphi'_i;$$

$\beta \in [0,1]$; and wherein $o_i$ are the values for the plurality of cells of the objective score array, $\varphi'_i$ are the values for the plurality of cells of the artificial potential field array, $s'_i$ are the values for the plurality of cells of the collision probability array, and $\beta$ is an aggression factor that represents a relative importance of safety.

9. The method of claim 8, further comprising the step of dividing, by the target-orientated navigation system, the area adjacent to a current position of the vehicle into K-by-K area in front of into a grid of having the plurality of lattices along two or more axes.

10. The method of claim 8, further comprising the steps of inverting the values of the plurality of cells of the collision probability array to determine which cells of the collision probability array satisfy the safety criteria.

11. The method of claim 8, wherein a cell in the objective score array that has a highest value is expressed as:

$$T'_t = \underset{i}{\mathrm{argmax}}\, o_i.$$

12. The method of claim 8, further comprising the step of updating the target position to a new target position when the vehicle has reached the target position.

13. The method of claim 12, wherein the new target position is determined based on a route to an ultimate target position.

14. The method of claim 8, further comprising the steps of:
determining a location of the vehicle along a route; and
directing, by a handover control system, the vehicle control system to utilize commands from either the target-orientated navigation system or the generic navigation system based on the location of the vehicle along the route.

15. A non-transitory computer-readable medium for operating a vehicle having a generic navigation control system and a target-orientated navigation system and including instructions that when executed by one or more processors cause the one or more processors to:
  receive perception data from a vehicle perception system of the vehicle;
  discretize, by the target-orientated navigation system, the perception data into an area adjacent to a current position of the vehicle, the area comprising a plurality of lattices;
  generate, by the target-orientated navigation system, a collision probability array having a plurality of cells that correspond to the plurality of lattices, the cells of the collision probability array indicating a likelihood of a collision if the vehicle moves to the area represented by the cells of the collision probability array;
  determine, by the target-orientated navigation system, which cells of the collision probability array satisfy a safety criteria;
  receive, by the target-orientated navigation system, an artificial potential field array having a plurality of cells that correspond to the plurality of cells of the collision probability array, values for the plurality of cells of the artificial potential field array being a function of a proximity of the current position of the vehicle from a target position;
  generate, by the target-orientated navigation system, an objective score array having a plurality of cells corresponding to the cells of the collision probability array that satisfied the safety criteria, wherein the values for the cells of the objective score array are based on the values of corresponding cells of the collision probability array and the artificial potential field array;
  direct, by the target-orientated navigation system, a vehicle control system of the vehicle to guide the vehicle to a location representative of a cell in the objective score array that has a highest value;
  wherein the values for the plurality of cells of the objective score array are:

$$o_i = \beta * s'_i + (1-\beta) * \varphi'_i;$$

$$\beta \in [0,1]; \text{ and}$$

wherein $o_i$ are the values for the plurality of cells of the objective score array, $\varphi'_i$ are the values for the plurality of cells of the artificial potential field array, $s'_i$ are the values for the plurality of cells of the collision probability array, and $\beta$ is an aggression factor that represents a relative importance of safety.

16. The non-transitory computer-readable medium of claim 15, further including instructions that when executed by one or more processors cause the one or more processors to update the target position to a new target position when the vehicle has reached the target position.

17. The non-transitory computer-readable medium of claim 16, wherein the new target position is determined based on a route to an ultimate target position.

18. The non-transitory computer-readable medium of claim 15, further including instructions that when executed by one or more processors cause the one or more processors to:
  determine a location of the vehicle along a route; and
  direct, by a handover control system, the vehicle control system to utilize commands from either the target-orientated navigation system or the generic navigation system based on the location of the vehicle along the route.

* * * * *